United States Patent

Jones et al.

[11] Patent Number: 4,921,129
[45] Date of Patent: May 1, 1990

[54] LIQUID DISPENSING MODULE

[75] Inventors: K. Tom Jones, Chandler; Richard J. Caldwell, Scottsdale, both of Ariz.

[73] Assignee: Pacific BioSystems, Inc., Phoenix, Ariz.

[21] Appl. No.: 217,303

[22] Filed: Jul. 11, 1988

[51] Int. Cl.$^5$ .............................................. B67D 5/06
[52] U.S. Cl. ...................................... 222/23; 222/51;
 222/66; 222/325; 137/558; 73/304 R; 116/227; 134/113; 134/117
[58] Field of Search ...................... 222/51, 23, 64, 66, 222/147, 165, 325, 192; 137/558; 73/304 R; 116/227; 239/74, 310, 375; 134/113, 117, 199; 128/65, 66

[56] References Cited

U.S. PATENT DOCUMENTS

| | | | |
|---|---|---|---|
| 2,673,007 | 3/1954 | Debrie | 222/325 X |
| 2,965,267 | 12/1960 | Darr | 222/88 |
| 3,459,343 | 8/1969 | Rasmussen | 222/477 |
| 3,465,915 | 9/1969 | De Harde | 222/66 |
| 3,836,050 | 9/1974 | Dreibelbis | 222/66 |
| 3,871,560 | 3/1985 | Crippa | 222/325 |
| 4,009,598 | 3/1977 | Bernard et al. | 68/12 R |
| 4,164,306 | 8/1979 | Perrin | 222/181 |
| 4,186,849 | 2/1980 | Spangler | 222/25 |
| 4,264,019 | 4/1981 | Roberts et al. | 222/95 |
| 4,345,627 | 8/1982 | Cassia | 141/18 |
| 4,391,309 | 7/1983 | Steiner | 141/18 |
| 4,489,857 | 12/1984 | Batlas | 222/179 |
| 4,714,176 | 12/1987 | Wijen | 222/51 |

FOREIGN PATENT DOCUMENTS 631134  7/1982  Switzerland .......................... 222/23

Primary Examiner—Kevin P. Shaver
Assistant Examiner—David H. Bollinger
Attorney, Agent, or Firm—LaValle D. Ptak

[57] ABSTRACT

A disposable liquid dispensing module in the form of a hollow plastic container for holding liquid, such as a cleaning solution or soap, has at least one liquid level sensing probe permanently mounted in it. The module is made to be inserted into a lavage machine or similar apparatus and includes a connector to which a connection plug having a liquid withdrawal pipe and connectors to the liquid level sensing probe is attached. The pipe is connected to an elongated flexible tube and the connectors for the liquid level sensing probe are connected to flexible wires, so that the plug including these components may be attached to the container outside the lavage machine in which it is used. When the level of liquid falls below a predetermined threshold, a signal is provided to the apparatus indicating that replacement of the container is to be made. The entire module then is withdrawn and the plug to the apparatus is disconnected. The original module is discarded and a new module filled with cleaning solution is attached to the plug and placed in the machine.

21 Claims, 3 Drawing Sheets

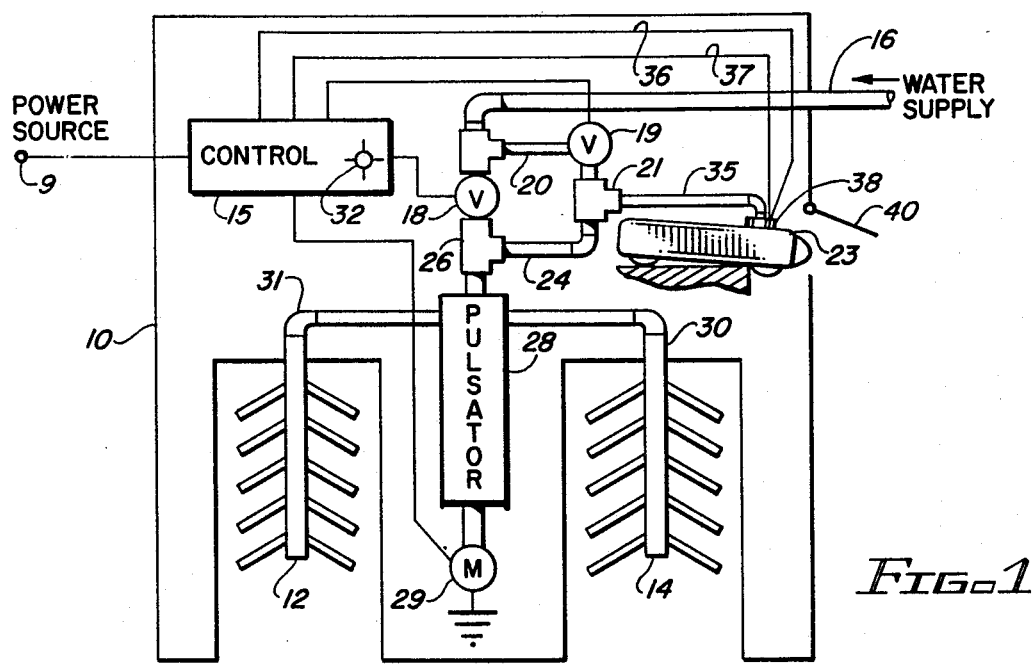
FIG-1
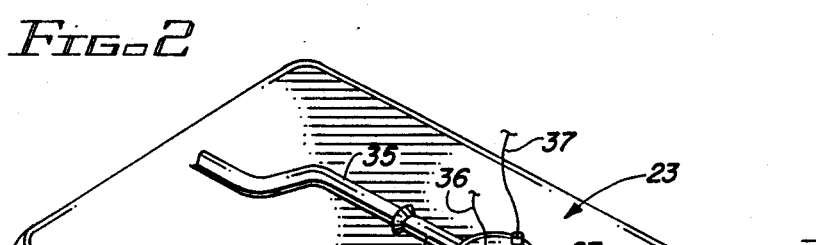
FIG-2
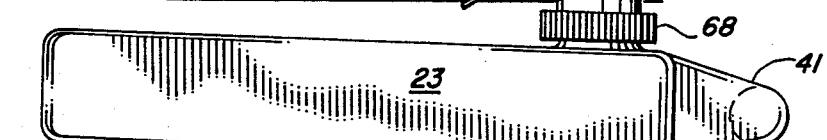
FIG-3
FIG-4

LIQUID DISPENSING MODULE

RELATED APPLICATION

This application is related to co-pending application Ser. No. 07/176,361, filed Mar. 31, 1988, now U.S. Pat. No. 4,802,508, issued Feb. 7, 1989.

BACKGROUND

The system of the present invention is particularly useful in conjunction with modern lavage devices where the cleaning solution is supplied through the liquid jet cleaning arms. In such devices, it is necessary to replenish the soap or other cleaning solution from time to time as it is consumed in the machine. Typically, this is accomplished by pouring cleaning solution or liquid soap into a reservoir which is permanently built into the lavage machine. Generally, the refilling of such a reservoir is from a large bottle or other container which is used to store the cleaning solution and which most frequently holds a greater amount of cleaning solution than the reservoir in the lavage machine. Thus, it is important for an operator to be careful not to overfill or spill the cleaning solution during the refilling operation.

A variety of applications exist for dispensing liquid soap and the like at a point of use. Such soap dispensers, for example, are widely used in public restrooms to dispense a measured amount of liquid soap onto the hands of the user. Since the soap is stored in a closed container, no unsightly dirty soap bars are left on the counter top. Furthermore, the use of liquid soap within a dispensing container prevents the theft of or removal of soap from the restroom or the like where it is used.

Liquid soap dispensers of the type typically used in public restrooms and which employ a modular or throw-away container for replenishing the soap, are disclosed in the Pat. Nos. to Darr No. 2,965,267; Cassia No. 4,245,627; and Steiner No. 4,391,309. The dispensers which are disclosed in all three of these patents use a replaceable liquid container which is placed upside down in a container holding portion of the dispenser. During placement of a new liquid container, a puncturing or piercing member opens the new container to permit the fluid in it to flow into a sump located immediately below the container. This essentially prevents spilling of liquid soap from the new container during the refilling operation. It is necessary, however, to remove the old container (which similarly was opened or punctured during the original placement in the dispenser) from its inverted position in the dispenser. Thus, any residual liquid soap which may still be present in such a container, may be spilled from or dripped from the container during its removal.

None of the devices disclosed in these patents have any provisions for monitoring the liquid soap level. The only way a user realizes that the container is empty is when both the container and the sump are empty, and no further liquid soap can be withdrawn from the dispenser.

Two other patents to Perrin U.S. Pat. No. 4,164,306 and Batlas U.s. pat. No. 4,489,857 disclose liquid hand soap dispensers with sumps in them. The replacement bottles for these devices have tops which are opened before the replacement bottles are inserted upside down into the containers. Consequently, there is considerable opportunity for spillage of the liquid soap during the refilling operation. Neither of these patents disclose any liquid level monitoring to determine the amount of liquid soap remaining in either the container or the device.

The DeHarde U.S. Pat. No. 3,465,916 discloses a sump system in which bottles for various liquids are first opened and then inserted upside down over the sumps. Consequently, this patent is similar to the Perrin and Batlas Patents. The device of DeHarde, however, includes electrical liquid level monitoring sensors. These sensors are built into and remain in place in the sump. The DeHarde device is refilled from standard bottles or containers for the various liquids which are to be dispensed from the apparatus. Such containers first are opened and then poured into the sump.

Whenever a permanent reservoir or permanent sump remains in place in the dispenser for either a conventional soap dispenser or a lavage machine, there is a strong possibility that over a period of time a residue of old cleaning solution may build up on the interior wall and bottom of the sump. In addition, where a permanent sump or reservoir is built into a machine or device from which liquid cleaning solutions are dispensed, there is a possibility of contamination which can take place during the filling operation. In addition, if one type of cleaning solution, including a first group of chemicals, is used at one time in the machine or dispenser and subsequently a different type of cleaning solution having different chemicals is poured into the sump, there is a possibility of an undesirable chemical reaction taking place. In addition, it is possible that the mixing of different types of cleaning solutions in a sump may result in unwanted build-up of residue in the sump or an incompatible mixture o cleaning fluids.

Consequently, it is desirable to provide an improved disposable liquid dispensing module for use in equipment having apparatus for withdrawing liquid therefrom, such as lavage machines and the like. Such a module, ideally, should be self-contained and capable of simple and effective replacement with a minimum possibility of spillage of the cleaning solution.

SUMMARY OF THE INVENTION

Accordingly, it is an object of this invention to provide an improved liquid dispensing device.

It is another object of this invention to provide an improved modular liquid dispensing device.

It is an additional object of this invention to provide an improved modular liquid cleaning solution dispensing device particularly useful in lavage machines.

It is a further object of this invention to provide a disposable liquid dispensing module having liquid level sensors built into it for use in conjunction with equipment to provide an indication that the level of liquid in the module has fallen below a pre-established threshold level.

In accordance with a preferred embodiment of the invention, a disposable liquid dispensing module is made for use with equipment having apparatus in it for withdrawing liquid from the module. The module itself comprises a hollow container for holding the liquid to be dispensed. A liquid level sensor is mounted in the container for use in conjunction with the liquid withdrawing apparatus in the equipment to provide an indication when the level of liquid in the container is less than a pre-established minimum threshold. A liquid withdrawal opening is provided in the container for connection with the withdrawing apparatus. An indicator coupling is also provided in the container for connection to the liquid level sensing device for releaseable connection with an indicator in the equipment to provide an indication of the level of liquid in the container. A provision also is made for closing the liquid withdrawal opening during shipping and storage of the container.

BRIEF DESCRIPTION OF THE DRAWING

FIG. 1 is a diagrammatic representation of a lavage machine in which a preferred embodiment of the invention is used;

FIG. 2 is a top perspective view of a preferred embodiment of the invention;

FIG. 3 is a side view of the embodiment shown in FIG. 2;

FIG. 4 is a bottom view of the embodiment shown in FIG. 2;

DETAILED DESCRIPTION

Figure 5:
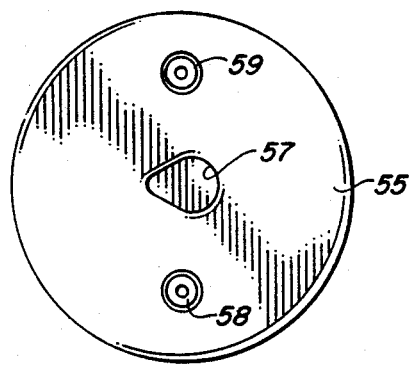
FIG. 5 is an enlarged top view of a portion of the embodiment shown in FIGS. 2, 3 and 4.

Reference now should be made to the drawings in which the same reference numbers are used throughout the different figures to designate the same components. FIG. 1 is a diagrammatic representation of a lavage machine 10 which is of the type disclosed in the above-identified co-pending application Ser. No. 07/176,361. Since the actual construction of the lavage machine essentially can be of any known type, details of that construction have not been shown in the diagrammatic representation of the machine in FIG. 1.

The lavage machine 10 includes a pair of spray nozzle manifolds 12 and 14 for washing the left and right hands, respectively, of a user. These manifolds may be of any desired type. In a machine of the type shown in FIG. 1, water is obtained from a standard municipal water supply line 16 (preferably after being heated in a water heater). Normally, water from the supply line 16 is prevented from being applied to the manifolds 12 and 14 by closed electric valves 18 and 19.

When the machine of FIG. 1 is to be used, a control system 15, supplied with suitable operating power from a source 9 (not shown) is operated to open both of the valves 18 and 19. Some of the water from the supply 16 passes directly through the valve 18 and through a conventional plumbing "Tee" 26, to a pulsator 28. Water also is supplied from the line 16 through the valve 19 over a line 20 into a venturi "Tee" 21 connected to a modular liquid soap or liquid cleaning solution dispenser 23. The water passing through the venturi 21 withdraws a predetermined amount of soap or cleaning solution from the dispensing module 23 through a flexible withdrawal hose 35. The soap which is withdrawn from the dispenser 23 is mixed with the water and is provided through a pipe 24 to the "Tee" 26. There it is mixed with the water flowing through the valve 18 from the water supply, and this mixture is supplied as a combination water/soap mixture to the pulsator 28.

The pulsator 28 is used to provide cylically varying pulses of water, 180° out of phase, through a pair of outlet pipes 31 and 30, respectively, to the spray manifolds 12 and 14 in the lavage machine. The manner in which this operation is effected by the pulsator 28 is described in detail in co-pending application Ser. No. 07/176,361. Briefly, however, operation of the pulsator 26 to effect the cleaning function is provided by a motor 29, which is turned on by the control system 15 at the time the valves 18 and 19 are opened. A drain (not shown) removes the spent fluid from the machine. At the end of a lavage cycle, the control system 15 closes the valves 18 and 19 and turns off the motor 29. The system then remains in this standby state until the next time it is to be used.

In addition to the operation described above, the soap dispensing module 23 has a liquid level sensor built into it to provide signals over a pair of wires 36 and 37 to the control system 15. These wires are connected to the liquid level sensors, located within the module 23, at a cap or plug 38. Whenever the level of the soap or cleaning solution within the dispensing module 23 is nearly exhausted, an indication is provided over the wires 36 and 37 to control system 15 which causes an indicator light 32 on a front panel to be turned on to alert users of the machine that the cleaning solution or soap is used up or is nearly used up and that the dispenser module 23 needs to be replaced.

The module 23 may be located at any convenient place in the machine. Typically the module is accessible through the front or side behind a hinged door or panel 40. Normally, when the machine is in use, no attention whatsoever needs to be paid to the module 23 or the amount of cleaning solution in it. When the light 32, however, on the control panel is turned on, the door 40 is opened and the module 23 is withdrawn outwardly through the door 40 for replacement. The plug or connector 38 is detached from the module 23 which then is thrown away. A new module 23 then is attached to the plug 38, is inserted through the open door 40 to the position shown in FIG. 1, and the machine is ready for continued operation until the level of cleaning solution in the new module is depleated. At such time, the foregoing replacement cycle is repeated.

Reference now should be made to FIGS. 2 through 6 which illustrate details of the module 23. As is readily apparent from an examination of FIGS. 2, 3 and 4, the soap or cleaning solution dispensing module 23 is in the form of a low profile, elongated container, the vertical height of which is less than both the width and length and in which the length is approximately one and one-half (1½) times the width. These dimensions, however, are not critical but have been found to be particularly well suited with the lavage machine of the type shown in FIG. 1. Because of the low profile of the dispensing module 23, it may be located in an area near the bottom of the lavage machine where limited vertical space is present. The module 23 is made of any suitable disposable material and typically is in the form of an molded plastic "bottle" having the shape shown in FIGS. 2, 3 and 4.

The end of the module which is adjacent the door 40 in the machine has a handle 41 formed in it. This handle typically is hollow, so that cleaning solution may flow into and out of it. By forming the handle 41 as illustrated in FIGS. 2 through 4, withdrawal of and replacement of different modules 23 in the lavage machine shown in FIG. 1 is readily effected. As illustrated in FIGS. 3 and 4, a pair of projections 44 are provided on the end of the module opposite the handle 41 and a circular enlarged sump 45 is provided at the bottom of the module near the handle 41. The relationship of this sump to the bottom of the module 23 is illustrated most clearly in FIG. 6.

Figure 6:
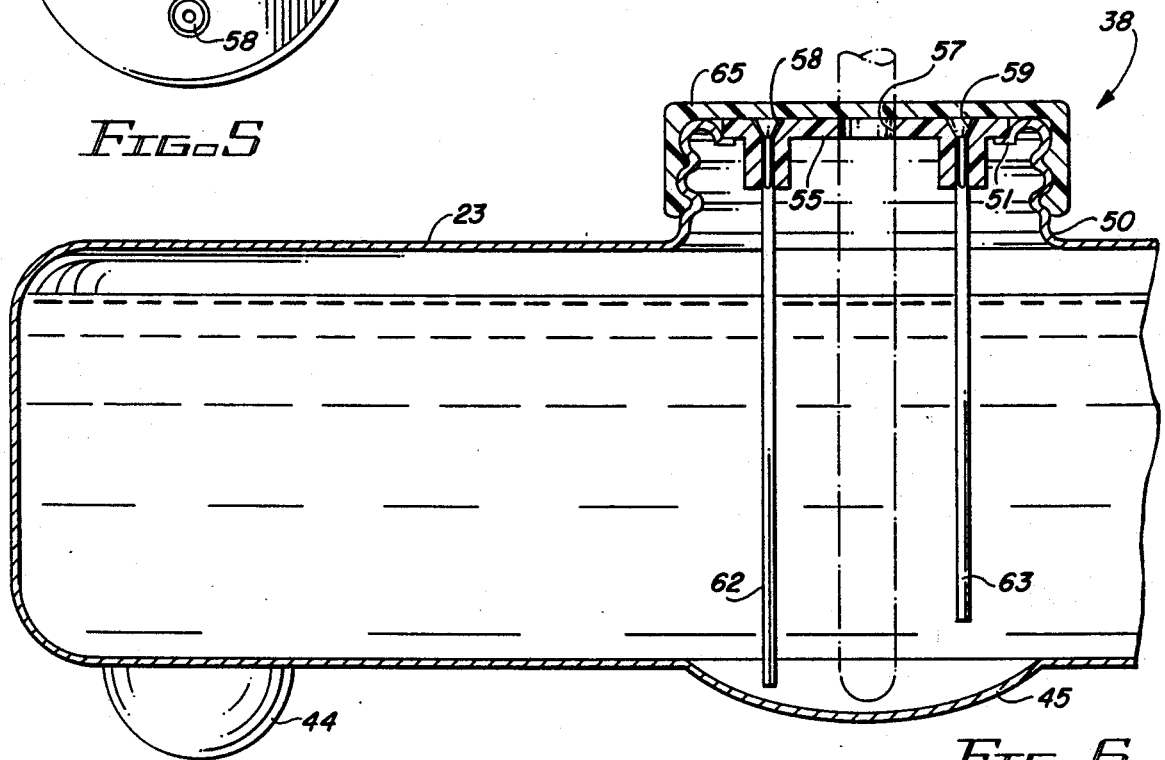
FIG. 6 is a cross-sectional view across the width of the embodiment shown in FIG. 3.

Directly above the sump 45 is a threaded "fill" opening 50 (shown most clearly in FIG. 6). Cleaning solution or liquid soap is poured through the opening 50 during the filling operation of the module 23. After the module has been filled, a closure cap 55 is permanently bonded (such as by heat staking) to an inwardly turned ledge 51 formed at the top of the opening 50 to seal the opening. The cap 55, as shown most clearly in FIGS. 5 and 6, has a single probe 63 or a pair of electrically conductive probes 62 and 63 extending downwardly through it. The probe 62 has a length which causes it to extend to the bottom of the sump 45 or to a position close to the bottom. The probe 63 is shortr than the probe 62 (when it is used) and extends to a position which is indicated in FIG. 6 as being slightly above the bottom of the main portion of the dispenser module 23.

The center of the cap 55 has a liquid withdrawal opening 57 in it. The dimensions of the opening 57 are selected to conform to the outer dimensions of a withdrawal probe which is subsequently inserted through the opening 57 when a new module is to be placed in operation in a lavage machine of the type shown in FIG. 1.

After the dispenser module 23 has been filled and after the cap 55 has been permanently bonded to the ledge 51, a temporary shipping cap 65 is screwed downwardly onto the neck 50 to seal the opening 57 and to cover a pair of connector receiving openings 58 and 59 which electrically interconnect with the upper ends of the probes 62 and 63. The shipping cap 65 may be any suitable type of disposable plastic cap or the like typically used with milk containers, condiment bottles or the like. Once the dispenser module 23 has been filled and sealed, it then may be shipped and stored for indefinite periods of time without any danger of spillage or loss of the fluid within the container. The opening 57 also may be sealed with a rupturable plastic membrane, if desired. If such a membrane is used, the cap 65 is not necessary.

Reference now should be made to FIGS. 7 through 10 which illustrate the connecting plug portion of the system which interconnects the disposable dispenser module of FIGS. 2 through 6 with the control system 15 and the pipe 35 of the system shown in FIG. 1. When the module 23 is to be placed in the lavage machine, the cap 65 (FIG. 6) is removed and discarded. The plug assembly shown in FIGS. 7 through 10 then is placed on top of the neck 50 to provide the fluid withdrawal and electrical interconnections with the module 23 which are necessary to permit it to be used in the system shown in FIG. 1. This is accomplished by means of the plug assembly 38 which includes an upper housing member 67 with an outwardly extending flange (most clearly shown in FIGS. 8 and 9) around its bottom edge. This flange is dimensioned to overlie the top of the threaded neck 50 and is adapted to press firmly against the upper surface of the cap 55 permanently secured in the opening of the neck 50 as described previously.

Figure 7:
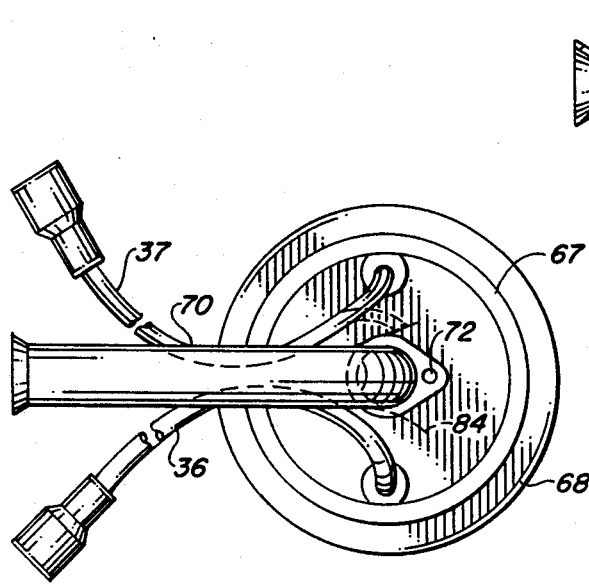
FIG. 7 is a top view of a portion of the embodiment shown in FIG. 2.
Figure 9:
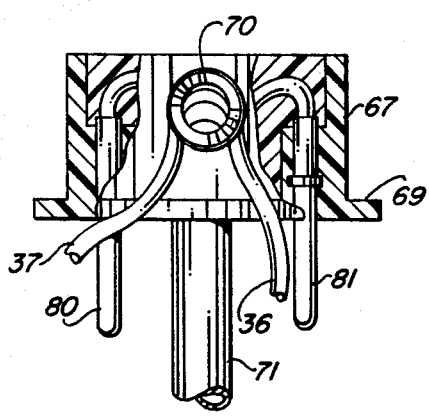
Figure 10:
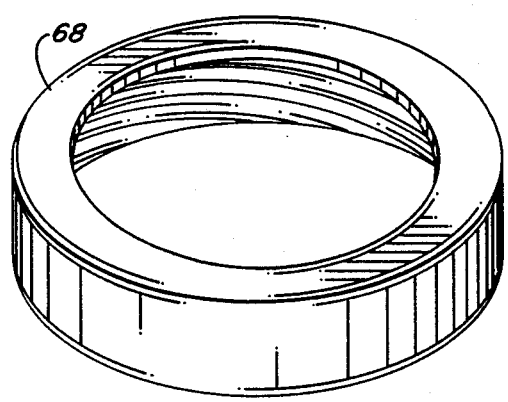
FIG. 10 is an enlarged view of a portion of the device shown in FIGS. 7 and 8.
Figure 11:
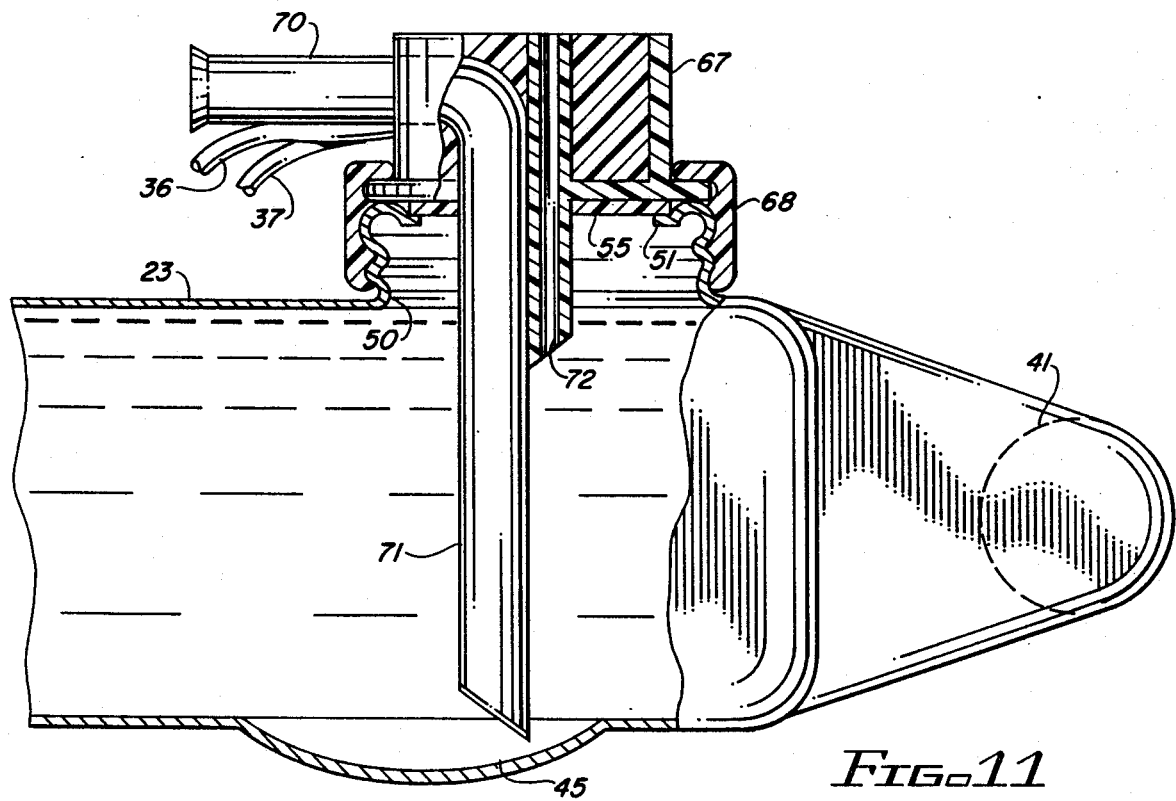
FIG. 11 is a cross-sectional view across the length of the assembly of the embodiment of FIGS. 2 and 3.

As shown most clearly in FIG. 9, two electrically conductive pins 80 and 81 (or a single pin 80) are mounted in the member 67 and are securely held in place in it. These pins 80 and 81 extend beneath the flange 69 and are spaced apart to fit within the openings 58 and 59 to provide electrical interconnections between the pins 80 and 81 and the probes 62 and 63, respectively. This form of electrical connection is used extensively in a variety of different applications. The wires 36 and 37 as shown in FIG. 7, terminate in connectors for engagement with corresponding wires extending out of the control system 15 (FIG. 1). The wires 36 and 37 are attached to the tops of the pins 80 and 81 and are in electrical contact with the pins.

A fluid withdrawal tube 71, which may be made either of plastic or of metal, extends downwardly substantially near the center of the member 67, and an air admitting pipe 72 is provided through the member 67 immediately adjacent the withdrawal tube 71. This is shown most clearly in FIG. 8. The tube 71 and the air withdrawal pipe 72 fit snugly within the correspondingly shaped opening 57 in the top of the cap 55. An elbow 70 extends at 90° (degrees) from the top of the tube 71 (and may be integrally formed with the tube 71) for connection to the flexible withdrawal hose 35. This connection may be made in any suitable manner, such as a threaded connector or a force fit connection, depending upon the specific application desired. Sufficient length is provided in the wires 36 and 37 which extend from the control system 15 (FIG. 1) and the flexible hose 35 to permit the connections to be made to the member 67 in a manner allowing the plug to be moved into and out of the lavage machine through the door 40 at least to an extent sufficient to permit easy connection of the plug 67 with the cap 55 on the filler neck 50 of the disposable module 23 outside the lavage machine.

As mentioned previously, an alternative arrangement uses only a single conductive probe 63. When this is done, the pipe 71 is made of metal and the wire 37 is connected to a metal spring clip 84 (FIG. 7) attached to the pipe 71. This is shown in dotted lines in FIG. 7. The pipe 71 then serves the added function of the eliminated probe 62. The level sensing function is otherwise exactly the same as described above for the two probe embodiments shown in solid lines.

Figure 8:
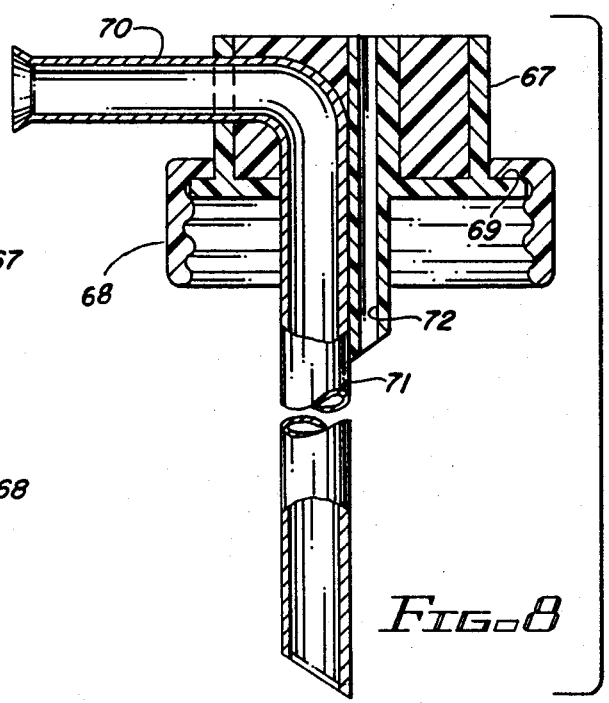
FIGS. 8 and 9 are cross-sectional side and end views, respectively, of the portion of the device shown in FIG. 7.

To secure the interconnection between the cap 67 and the threaded neck 50 extending upwardly from the top of the disposable module 23, an open threaded ring 68 is placed over the member 67 and overlies the top of the outwardly extending flange 69, as shown in FIG. 8. When the withdrawal pipe 71 is inserted through the opening 57, and the pins 80 and 81 are inserted into the receiving openings 58 and 59 to interconnect the unit, the cap 68 is screwed onto the neck 50 (from which the throw-away cap 65 has been removed) to hold the cap 67 securely in place on the top of the module 23. The lower side of the flange 69 is pressed tightly against the top surface of the cap 55, as described previously. In this position, fluid may be withdrawn from the module 23 as required by the lavage machine of FIG. 1. When the fluid drops below the point where contact is made by the probe 63, the "add solution" light 32 on the control panel is turned on, as described previously. When this occurs, reversal of the process which is used to interconnect a new module into the system is used to disconnect the old module. A new one then is inserted and placed within the machine for subsequent use. The light 32 typically is turned on when the amount of remaining solution in the module is enough to complete the current cycle of operation of the lavage machine.

The foregoing description of the preferred embodiment is to be considered as illustrative of the invention and not as limiting. Various changes and modifications will occur to those skilled in the art without departing from the true scope of the invention as defined in the appended claims.

We claim:

1. A system for dispensing liquid from a disposable liquid dispensing module to equipment having apparatus for withdrawing liquid from such module, the system including in combination:
   a hollow container for holding liquid to be dispensed;
   liquid level sending means permanently mounted in said container for sensing when the level of liquid in said container is less than a predetermined minimum threshold;
   a liquid withdrawal opening for connection to apparatus for withdrawing liquid;
   indicator coupling means attached to said sensing means;
   removable plug means;
   a liquid withdrawal pipe and at least one indicator connector means mechanically mounted together in said removable plug means having dimensions such that when said plug means is interconnected with said hollow container, said pipe extends through the liquid withdrawal opening in said container, and said indicator connector means is releasably interconnected with said indicator coupling means; and
   means for closing said withdrawal opening during shipping and storage of such container.

2. The combination according to claim 1 wherein said pipe in said plug means is coupled with a flexible hose for withdrawing liquid, and said indicator connector means is connected to a flexible electrical wire.

3. The combination according to claim 2 wherein said liquid level sensing means comprises a pair of spaced-apart conductive probes having different lengths for establishing said predetermined minimum threshold; and said coupling means comprises means for releasably connecting each of said probes with said indicator connector means.

4. The combination according to claim 3 wherein said container has a top and a bottom; and further including a sump portion in the bottom of said container comprising the lowest point in said container when said container is used; and wherein said liquid level sensing means is located at least in part in said pump portion.

5. The combination according to claim 4 wherein said means for closing said withdrawal opening during shipping and storage of said container is removed when said plug means is interconnected with said container.

6. The combination according to claim 5 further including a handle on said container.

7. The combination according to claim 6 wherein said container has a top and a bottom and at least first and second ends; and said handle is located on said first end thereof.

8. The combination according to claim 7 wherein the length and width of said container are less than the height thereof.

9. The combination according to claim 8 wherein the cross-section across the width of said container is substantially rectangular, the height of said container is substantially less than the width thereof, and the length of said container is substantially greater than the width thereof.

10. The combination according to claim 9 wherein said hollow container is made of plastic.

11. The combination according to claim 2 wherein said liquid level sensing means comprises at least one electrically conductive probe extending into said container spaced from said withdrawal pipe when said withdrawal pipe extends into said container; and said withdrawal pipe is made of electrically conductive material, with said indicator connector means coupled to said pipe and to said probe for providing an indication of the conductivity therebetween.

12. The combination according to claim 11 wherein said container has a top and a bottom; and further including a sump portion in the bottom of said container comprising the lowest point in said container when said container is used; and wherein said liquid level sensing means is located at least in part in said sump portion.

13. The combination according to claim 12 wherein said conductive pipe has a length greater than the length of said conductive probe, with said conductive pipe extending into said sump.

14. The combination according to claim 1 wherein said liquid level sensing means comprises spaced apart electrical conductive probes.

15. The combination according to claim 14 wherein said container has a top and a bottom; and further including a sump portion in the bottom of said container comprising the lowest point in said container when said container is used; and wherein said liquid level sensing means is located at least in part in said sump portion.

16. The combination according to claim 15 wherein at least one of said probes extends into said sump portion.

17. The combination according to claim 1 wherein said hollow container is made of plastic.

18. The combination according to claim 17 further including a handle on said container.

19. The combination according to claim 18 wherein said container has a top and a bottom and at least first and second ends; and said handle is located on said first end thereof.

20. The combination according to claim 19 wherein the cross-section across the width of said container is substantially rectangular, the height of said container is substantially less than the width thereof, and the length of said container is substantially greater than the width thereof.

21. The combination according to claim 1 wherein said liquid level sensing means comprises at least one electrically conductive probe extending into said container spaced from said withdrawal pipe when said withdrawal pipe extends into said container; and said withdrawal pipe is made of electrically conductive material, with said indicator connector means coupled to said pipe and to said probe for providing an indication of the conductivity therebetween.

* * * * *